United States Patent
Lupton et al.

(10) Patent No.: US 10,501,352 B2
(45) Date of Patent: Dec. 10, 2019

(54) NON-STRIPPING BIOREACTOR FOR BIOLOGICAL SULFIDE OXIDATION FROM WASTEWATERS AND GROUNDWATERS CONTAINING HYDROGEN SULFIDE

(71) Applicant: UOP LLC, Des Plaines, IL (US)

(72) Inventors: F. Stephen Lupton, Evanston, IL (US); William Sheridan, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/491,732

(22) Filed: Apr. 19, 2017

(65) Prior Publication Data

US 2017/0305773 A1 Oct. 26, 2017

Related U.S. Application Data

(60) Provisional application No. 62/324,969, filed on Apr. 20, 2016.

(51) Int. Cl.

| C02F 3/10 | (2006.01) |
|---|---|
| C02F 3/34 | (2006.01) |
| C02F 3/06 | (2006.01) |
| C02F 101/10 | (2006.01) |
| C02F 103/06 | (2006.01) |
| C02F 103/36 | (2006.01) |

(52) U.S. Cl.
CPC ............ C02F 3/345 (2013.01); C02F 3/06 (2013.01); C02F 3/10 (2013.01); *C02F 2101/101* (2013.01); *C02F 2103/06* (2013.01); *C02F 2103/365* (2013.01); *C02F 2301/046* (2013.01); *Y02W 10/15* (2015.05)

(58) Field of Classification Search
CPC ...... C02F 3/345; C02F 3/06; C02F 2101/101; C02F 3/10
USPC .................................................. 210/615, 617
See application file for complete search history.

(56) References Cited

U.S. PATENT DOCUMENTS

| 5,217,616 | A | 6/1993 | Sanyal et al. |
|---|---|---|---|
| 5,637,220 | A | 6/1997 | Buisman |
| 6,544,421 | B2 | 4/2003 | Haridas et al. |
| 7,005,068 | B2 | 2/2006 | Hoffland |
| 7,378,022 | B2 | 5/2008 | Lupton et al. |
| 2006/0060525 | A1* | 3/2006 | Hoffland ............ B01D 21/0012 210/603 |

(Continued)

FOREIGN PATENT DOCUMENTS

| EP | 880475 A1 | 12/1998 |
|---|---|---|
| JP | 2006035094 A | 2/2006 |
| RU | 2109692 C1 | 4/1998 |

OTHER PUBLICATIONS

Search Report dated Aug. 3, 2017 for corresponding PCT Appl. No. PCT/US2017/027097.

(Continued)

*Primary Examiner* — Claire A Norris

(57) ABSTRACT

A method is presented for biological removal of contaminants like sulfide from ground waters and industrial waters. A portion of the bioreactor effluent water is recycled to the bioreactor and the sulfide oxidizing bacteria by biological oxidation oxidizes sulfides in the water to produce soluble sulfates. The present invention uses a packed bed bioreactor configuration that uses packing material to maximize the concentration of sulfide oxidizing bacteria.

12 Claims, 2 Drawing Sheets

(56) References Cited

U.S. PATENT DOCUMENTS

2011/0024351 A1  2/2011  Janssen
2015/0344326 A1  12/2015  Van der Heijden et al.

OTHER PUBLICATIONS

Ajh Janssen, et al., Performance of a Sulfide-Oxidizing Expanded-Bed Reactor Supplied with Dissolved Oxygen, Biotechnology and Bioengineering, vol. 53, pp. 32-40 (1997).
Extended European Search Report for European application No. 17786352.9-1101, dated Oct. 17, 2019.

* cited by examiner

NON-STRIPPING BIOREACTOR FOR BIOLOGICAL SULFIDE OXIDATION FROM WASTEWATERS AND GROUNDWATERS CONTAINING HYDROGEN SULFIDE

CROSS-REFERENCE TO RELATED APPLICATION

This application claims priority from Provisional Application No. 62/324,969 filed Apr. 20, 2016, the contents of which cited application are hereby incorporated by reference in its entirety.

BACKGROUND

The present invention relates generally to method for the removal of pollutants from water. More specifically, the present invention relates to methods for biological removal of sulfides from high salinity ground waters and industrial wastewaters.

Environment-conscious industries are continuously laboring toward the goal of removing pollutants from contaminated water to make the water safe at both the ground level and the consumer level. Government-regulated agencies establish limits for many common industrial pollutants. These limits tend to become stricter as pollutant reduction and removal technology proves effective at accomplishing previously-established requirements. Consequently, both ground and consumer level water continue to improve in terms of both purity and safety.

Among the methods employed to reduce and remove pollutants, bioremediation constitutes an effective and desirable technology. In a broad sense, bioremediation includes the use of microorganisms that digest pollutants as a source of food, including nitrogen and carbon compounds. Bacterial metabolism can convert the pollutants to metabolites having a simple chemical structure to carbon dioxide and water in an aerobic process, or to methane in an anaerobic process. In any respect, the metabolites produced by bacteria typically have no adverse environmental effects.

The use of large volumes of water in hydraulic fracturing or "fracking," a technique to enhance the recovery of natural gas from organic containing shale deposits, has led to restrictions on use of fresh water reserves both above ground and from potable ground waters. The use of non-potable deep ground water brines for fracking does not put a strain on these fresh water reserves, but it does introduce new challenges, especially with regards to high levels of hydrogen sulfide present in brines. Several chemical processes have been developed, including chemical oxidation or stripping/adsorption techniques for sulfide removal from waste water, but they tend to be relatively expensive and require an undesirably large amount of time, machinery and high operational costs. Sludge disposal is one of major operating costs of biological treatment systems. The use of sulfur oxidizing bacteria that produces elemental sulfur in a suspended growth system produces large amounts of solids that contribute to sludge formation of both elemental sulfur solids and biological solids.

The oxidation of sulfides by the chemolithotrophic bacteria in a bioreactor to remove sulfide requires oxygen. The oxygen is generally provided by sparging air directly to the bioreactor. However, air sparging can result in extensive stripping of hydrogen sulfide out of the water phase before the bacteria are biochemically oxidize the sulfide to either elemental sulfur or soluble sulfate. Additionally, the stripped sulfide requires extensive scrubbing from the vent gas.

Therefore, there is a need for an improved method and apparatus for removing sulfides from waste water in a cost and time efficient manner. It is also desirable to provide such methods and systems that can replace some conventional chemical processes for removal of sulfides with improved biological processes and thereby reduce the requisite time, machinery, and operational costs for performing the processes.

SUMMARY

An embodiment of the present invention is a process for removing sulfides from a feed water stream in a bioreactor wherein said water stream contains from about 1 mg/L to about 2500 mg/L of sulfur compounds on an elemental sulfur basis, comprising passing the water stream through a fixed film bioreactor containing an effective quantity of autotrophic obligate chemolithotrophic bacteria immobilized on a packing material within the bioreactor. A portion of recycle water from a bioreactor effluent is recycled to the bioreactor. Air is passed to the said recycle water to saturate the recycle water with dissolved oxygen. The recycle water is mixed with the feed water stream to provide a mixed water stream. The sulfides are oxidized to sulfates. A purified water stream comprising less than about 0.5 mg/L sulfides are removed from the bioreactor.

The present invention seeks to provide a process for removing sulfides from a water stream in a bioreactor in a cost and time efficient manner. A benefit of the present invention is that the process of biological oxidation of sulfide is faster than prior art processes. In addition, the present invention solves the stripping problem in the bioreactor by contacting the sulfide containing water stream with oxygen saturated recycle water. The process advantageously avoids stripping, solid separation and disposal issues. These and other features, aspects, and advantages of the present invention will become better understood upon consideration of the following detailed description, drawings and appended claims.

DETAILED DESCRIPTION

Figure 1:
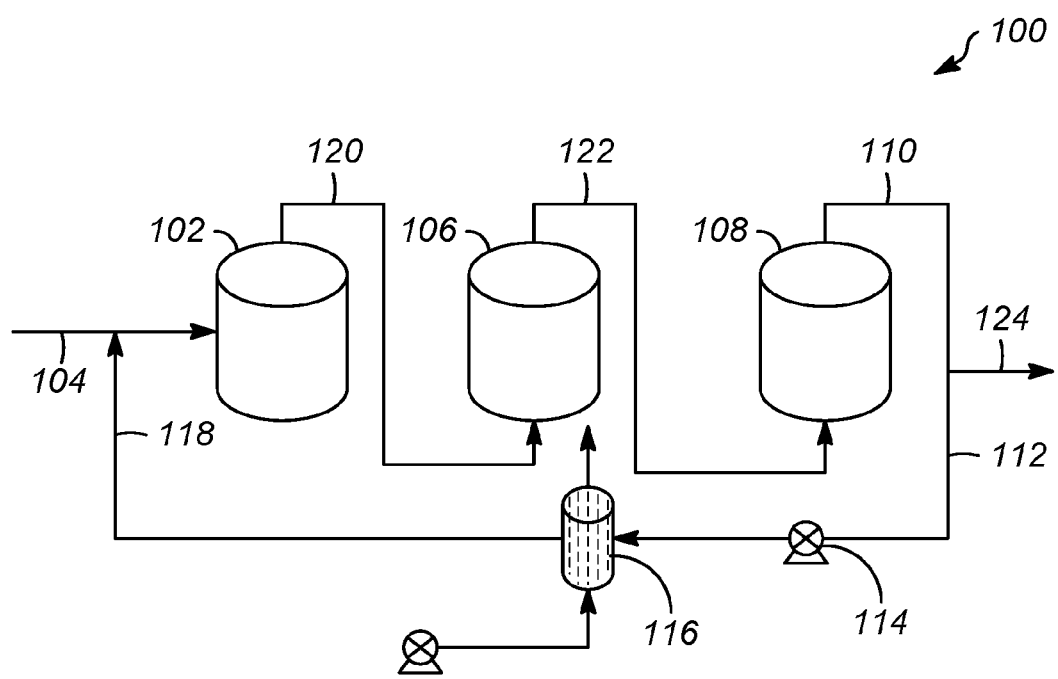
FIG. 1 is a schematic for the process of an embodiment of the present invention.

The microbial oxidation of reduced sulfur species by the use of bacteria, especially photosynthetic bacteria, to oxidize sulfide to elemental sulfur in a suspended growth mode is known. Bacteria have developed enzymes which are orders of magnitude more efficient than abiotic oxidation of sulfides by molecular oxygen. The present invention provides a method of using non-photosynthetic chemolithotrophic sulfur oxidizing bacteria that can oxidize sulfide to soluble sulfate rather than elemental sulfur. The bacterium that oxidizes sulfides to elemental sulfur often produces granules of sulfur so that sulfur is retained in the biomass.

The autotrophic obligate chemolithotrophic bacteria that are used in the present invention are a group of bacteria that gain metabolic energy from the oxidization of reduced sulfur compounds instead of gaining energy from the oxidation of organic compounds, unlike most other organisms. They grow by fixing carbon dioxide into organic compounds just like photosynthetic organisms. They use chemical energy from sulfide oxidation rather than light energy to do this biochemical step. The biochemical process involved in the mechanism are illustrated below:

The present invention uses a packed bed bioreactor configuration that uses two different packing materials. The packing used may be dual or mixed media packing. The packing used according to the present invention allows the buildup of high concentrations of obligatory halotolerant

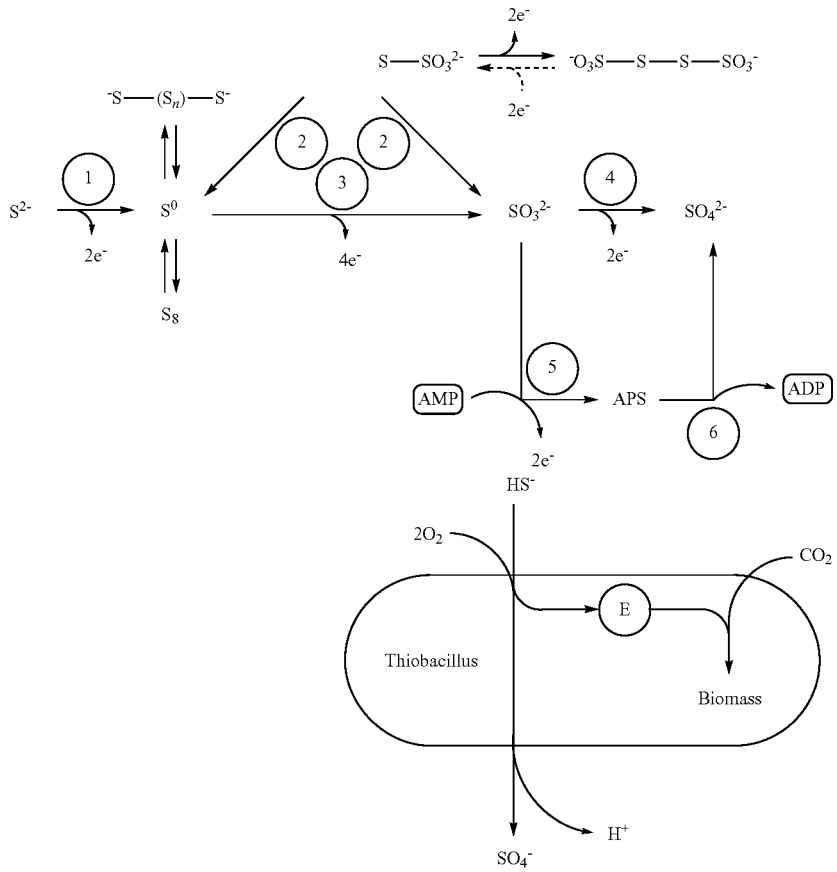

The chemolithotrophic bacteria used in the present invention are obligatory halotolerant and acidophilic. The bacteria may be found in marine or saline environments with salt concentration in excess of 1% total salinity. The optimal area to select the bacteria of the present invention is at the water/sediment interface, where the bacteria have access to both sulfide and oxygen.

The autotrophic obligate chemolithotrophic bacteria used in the present invention may be selected from the following species *Acidithiobacillus ferrooxidans, Thermithiobacillus tepidarius, Sulfurimonas denitrificans, Desulfocapsa sulfoexigens*, and some species of *Thiobacillus, Halothiobacillus, Acidiphilium, Thiomicrospira, Sulfolobus, Acidianus, Sulfurisphaera*, and *Sulfurococcus*. The chemolithotrophic sulfur oxidizing bacteria of the present invention can fully and efficiently oxidize sulfides to soluble sulfates.

The present invention provides a high performance bioreactor system that can be used to remove organics and sulfides from both gas and water streams using a proprietary bio-support and reactor design. The bioreactor system may be used to remove sulfide from sewer vent gas and organics formed during treatment of metal containing mining wastes. The bioreactor of the present invention is robust and provides cost effective solution for removal of sulfide from polluted water.

acidophilic, chemolithotrophic bacteria in the bioreactor to develop in microbial biofilms. The chemolithotrophic bacteria may colonize in the dual packing material in the fixed film bioreactor to high concentration of about 10,000 mg/L of fixed biomass. The packing used in the bioreactor also minimizes plugging and enables to maximize the contact between the sulfide and bacteria. The mixed media packing may be a mixture of polyurethane foam and plastic ball rings.

The oxidation of sulfide to elemental sulfur results in formation of alkaline conditions:

$$HS^- + \tfrac{1}{2}O_2 \rightarrow S^0 + OH^-$$

Alkaline conditions in the saline groundwaters results in scaling due to formation of calcium salts. The oxidation of sulfide by the chemolithotrophic sulfur oxidizing bacteria on the other hand produces acidic conditions which helps prevent the scaling problem in the highly saline groundwaters.

$$HS^- + 2O_2 \rightarrow SO_4^{2-} + H^+$$

The present invention provides a method to immobilize the bacteria in highly porous support matrix that prevents loss of bacteria and also reduces the solids leaving the bioreactor. The prevention of scaling problems allows the water to be used directly from the bioreactor as make-up water for fracking without any additional post-treatments like filtration. The oxygen is usually provided by air sparging to the bioreactor. However, air sparging can result in extensive stripping of hydrogen sulfide out of the water phase before the chemolithotrophic bacteria have a chance to biochemically oxidize the sulfide to soluble sulfate. The stripped sulfide requires extensive scrubbing from the vent gas. The present invention provides beneficially a design and process that allows for recycling of water to prevent the extensive stripping in the bioreactor.

A general understanding of the apparatus and process that allows recycling of water that solves the stripping problem can be obtained by reference to FIG. 1. FIG. 1 has been simplified by the deletion of a large number of apparatuses customarily employed in a process of this nature, such as vessel internals, temperature and pressure controls systems, flow control valves, recycle pumps, etc. which are not specifically required to illustrate the performance of the present invention. FIG. 1 shows three bioreactors as a representation, but the process of the present invention is not limited to three reactors. Furthermore, the illustration of the process of this present invention in the embodiment of a specific drawing is not intended to limit the present invention to specific embodiments set out herein.

The immobilized cell bioreactor (ICB) 100 comprises a first chamber 102, a second chamber 106 and a third chamber 108 including a first inlet in line 104 for receiving the feed and an outlet in line 124 for releasing the effluent. The feed to the bioreactor may be an aqueous stream containing sulfides. Typical feeds include briny groundwaters, fracking wastewaters, sulfidic caustic wastewaters, sour waters from refining and petrochemical processing, sulfidic sewer water, and sour water generated by anaerobic digesters or mixtures thereof. The feed water stream may comprise a salt concentration of more than 1% total salinity. The concentration of sulfide in the aqueous feed to the bioreactor may be about 1 mg/L to about 2500 mg/L and preferably in the range of about 10 mg/L to about 1,600 mg/L and more preferably in the range of 100 mg/L to 150 mg/L. The sulfides may be present in the feed as hydrogen sulfide or metallic sulfides such as sodium sulfide or iron sulfides. There may be little or no dissolved oxygen in the aqueous feed to the bioreactor. The chemolithotrophic bacteria may be supported on a substrate housed inside the chamber in a fixed bed and situated to contact with the feed flowing there through. The autotrophic obligate chemolithtrophic bacteria are immobilized on a packing material within the bioreactor. The term "fixed bed" signifies that the biologically active components and the bacteria supported thereon are substantially stationary as the feed flows through the bioreactor. The biologically active components are primarily a porous substrate.

The sulfides are oxidized to soluble sulfate by the chemolithotrophic bacteria in the bioreactor. A portion of a bioreactor effluent taken at the outlet of the third chamber 108 in line 110 is taken as recycle water in line 112. The recycle water in line 112 is recycled back to the first chamber 102 of the bioreactor. The recycle water in line 112 is passed through a recycle pump 114 and an aeration tank 116 before recycling the water to the first chamber of the bioreactor. The recycle water in line 112 is sparged with air to saturate the recycle water in line 112 with dissolved oxygen and provide oxygenated water in line 118. The concentration of oxygen dissolved in the recycle water is about 12 mg/L to 1 mg/L. The oxygenated recycle stream in line 118 is mixed with the aqueous feed in line 104 to the bioreactor. The sulfide containing feed is allowed to flow upflow through the packed bed of the bioreactor along with oxygenated water. The oxygen saturated recycle water in line 118 provides oxygen to the autotrophic obligate chemolithotrophic bacteria. The mixed water stream flow through said autotrophic obligate chemolithotrophic bacteria.

The ratio of oxygenated recycle water to sulfide containing aqueous feed is such that the there is enough oxygen for the chemolithotrophic bacteria to completely oxidize the dissolved sulfide in the combined mixed stream of water to soluble sulfate. The ratio of the oxygenated recycle water to the feed water stream is about 18 to 1. The first effluent in line 120 taken at the outlet of the first chamber 102 is fed to the second chamber 106. The first effluent in line 120 may comprise sulfide concentration of about 6.25 mg/L and less than about 3 mg/L dissolved oxygen. The second effluent in line 122 taken at the outlet of the second chamber 106 is fed to the third chamber 108. The second effluent in line 122 may comprise sulfide concentration of about 1 mg/L and less than about 2 mg/L dissolved oxygen. The sulfide free water is taken as the final effluent in line 124 from the bioreactor and may be used as fracking make-up water for discharge in the case of industrial waste water.

The deoxygenated water in the bioreactor effluent in line 110 taken at the outlet of the third chamber 108 of the bioreactor is sparged with air and may be recycled back to the first chamber 102 of the bioreactor after every cycle to provide enough time and dissolved oxygen for the immobilized bacteria to oxidize the sulfide containing mixed water stream fed to the bioreactor. This allows multiple passes of the stripped sulfide through the packed bed. The stripped sulfide is re-dissolved in the aqueous phase and may be oxidized by the autotrophic obligate chemolithtrophic bacteria. The oxygenated recycle water in line 118 may be split into two streams and passed to the first and the second chamber of the bioreactor separately.

The purified effluent stream from the bioreactor in line 124 comprises reduced sulfide concentration to about less than 0.5 mg/L and preferably of about less than 0.2 mg/L. The purified effluent water may be reused in an industrial process or discharged into nearby ground water. Table 1 shows experimental data for the concentration of sulfide present in effluent of the bioreactor in comparison to feed.

TABLE 1

| Concentration in mg/L | |
| --- | --- |
| Sulfide in Feed | Sulfide in Effluent |
| 42.2 | 0.2 |
| 47 | 0.27 |
| 50 | 0.2 |
| 123 | 0.19 |
| 51 | 0.1 |
| 63 | 0.08 |
| 59 | 0.08 |
| 781 | 0.05 |
| 1,674 | 0.125 |
| 1,645 | 0.066 |
| 1,464 | 0.257 |
| 455 | 0.014 |
| 146 | 0.008 |
| 380 | 0.064 |
| 465 | 0.074 |
| 502 | 0.009 |
| 456 | 0.005 |
| 2 | 0.025 |
| 57 | 0.117 |
| 144 | 0.144 |
| 158 | 0.122 |

TABLE 1-continued

| Concentration in mg/L | |
|---|---|
| Sulfide in Feed | Sulfide in Effluent |
| 108 | 0.119 |
| 1 | 0.042 |
| 70 | 0.048 |
| 109 | 0.022 |
| 101 | 0.018 |
| 136 | 0.031 |

Figure 2:
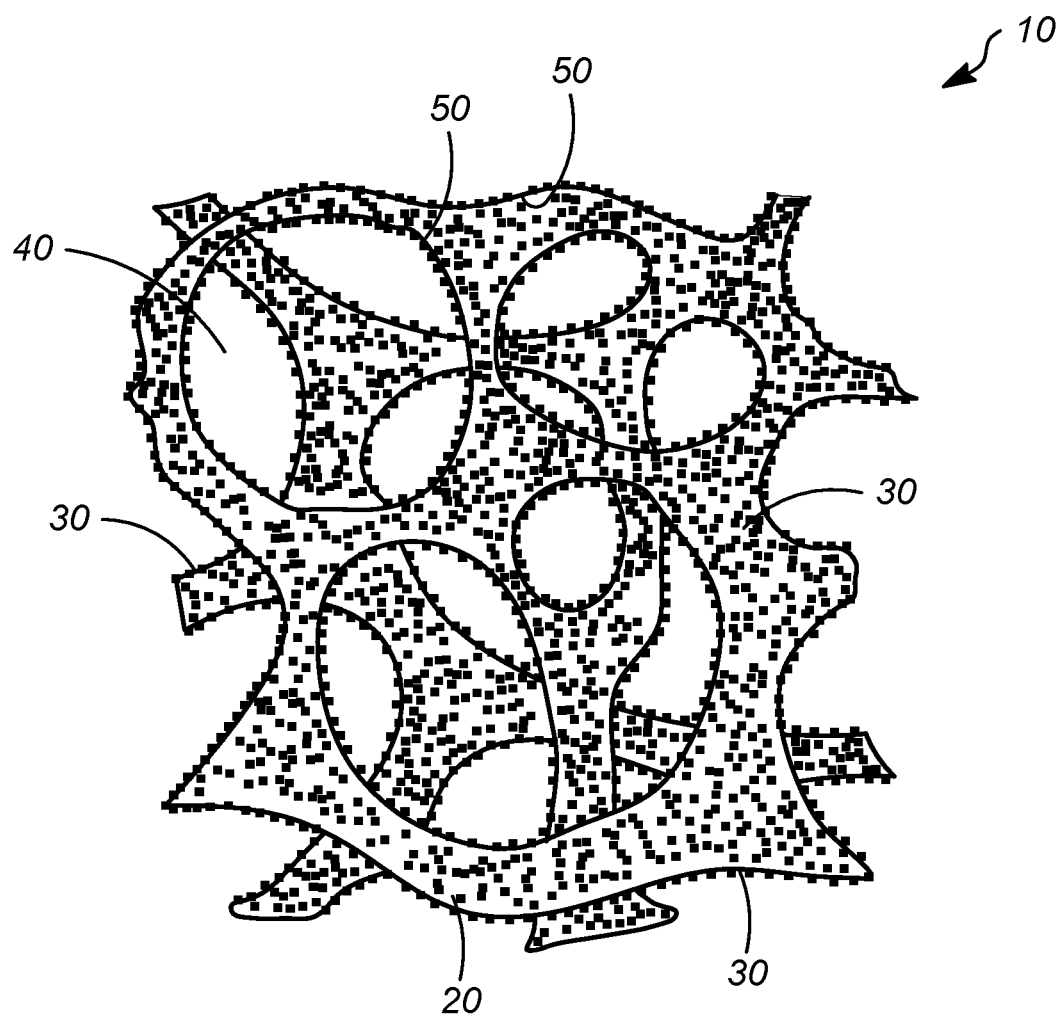
FIG. 2 is a cross-sectional view of a biologically active component that is used to remove pollutants from waste water in accordance with an embodiment of the present invention.

FIG. 2 is a cross sectional view of an exemplary biologically active component 10. The biologically active component may be a porous substrate 20. The porous substrate 20 defines a web of walls having passages or voids 40 there between. The web-like structure provides a high surface area to volume ratio, and consequently supports a high concentration of microorganisms 30, typically colonized as a microbial biofilm, and including bacteria capable of metabolizing pollutants contained in the waste water stream. In an exemplary embodiment, at least part of the component substrate 20 includes an absorbent 50 or is otherwise provided with a capacity for absorbing one or more pollutant from the waste water stream to enhance pollutant biodegradation using the microorganisms 30. In another exemplary embodiment, the substrate itself is sufficiently absorbent for particular pollutants that a coating of absorbent is not necessary. Other optional materials may be included on or in the component surface 20, including cations and/or materials having positively charged groups, and density-increasing substances, density-reducing substances, coloring agents, and short fibers of an organic or inorganic base such as glass fibers and gel-forming macromolecular substances such as cellulose, alginate, starch, and carrageenan.

Each of the biologically active components 10 is a particulate having a size and shape that may vary widely from particulate to particulate. For example, the components 10 may have a regular shape such as a cube, rod, rectangle, sphere, spiral, or hexagon, or they may have an irregular shape. The particulate size may be anywhere between about 0.10 inch to about 12 inches. The amount of substrate 20 included in the components 10 may vary widely, although in general the amount of substrate 20 for each particulate is from about 50 to about 20 weight percent based on the total particulate weight, with the remaining weight percentage being primarily attributed to microorganisms 30 and any absorbent that may be included. The voids 40 are from about 40 to about 98 volume %. The substrate 20 is formed from any material capable of forming a porous particulate and supporting microorganisms 30. Inorganic materials and organic plastics are exemplary materials, including those disclosed in U.S. Pat. No. 5,217,616, which also discloses exemplary materials for other reactor components.

While the present invention has been described with what are presently considered the preferred embodiments, it is to be understood that the present invention is not limited to the disclosed embodiments, but it is intended to cover various modifications and equivalent arrangements included within the scope of the appended claims.

Specific Embodiments

While the following is described in conjunction with specific embodiments, it will be understood that this description is intended to illustrate and not limit the scope of the preceding description and the appended claims.

A first embodiment of the invention is a process for removing sulfides from a water stream in a bioreactor wherein said water stream contains from about 1 mg/L to about 2500 mg/L of sulfur compounds on an elemental sulfur basis, comprising passing said water stream through a fixed film bioreactor containing a effective quantity of autotrophic obligate chemolithotrophic bacteria immobilized on a packing material within said bioreactor; recycling a portion of a recycle water from a bioreactor effluent to the bioreactor; passing air to the said recycle water to saturate the recycle water with dissolved oxygen; mixing the recycle water with the feed water stream to provide a mixed water stream; oxidizing said sulfides to form sulfates; and removing a purified water stream comprising less than about 0.5 mg/L sulfides from said bioreactor. An embodiment of the invention is one, any or all of prior embodiments in this paragraph up through the first embodiment in this paragraph wherein said water stream is selected from the group consisting of briny ground water, fracking wastewater, sulfidic caustic wastewater, sour water from refining or from petrochemical processing, sulfidic sewer water, and sour water generated by anaerobic digesters and mixtures thereof. An embodiment of the invention is one, any or all of prior embodiments in this paragraph up through the first embodiment in this paragraph wherein autotrophic obligate chemolithotrophic bacteria are selected from the group consisting of *Acidithiobacillus ferrooxidans, Thermithiobacillus tepidarius, Sulfurimonas denitrificans, Desulfocapsa sulfoexigens*, and some species of *Thiobacillus, Halothiobacillus, Acidiphilium, Thiomicrospira, Sulfolobus, Acidianus, Sulfurisphaera*, and *Sulfurococcus*. An embodiment of the invention is one, any or all of prior embodiments in this paragraph up through the first embodiment in this paragraph wherein said purified water stream comprises less than about 0.2 mg/L sulfides. An embodiment of the invention is one, any or all of prior embodiments in this paragraph up through the first embodiment in this paragraph wherein the ratio of the recycle water to the feed water stream is about 18 to 1. An embodiment of the invention is one, any or all of prior embodiments in this paragraph up through the first embodiment in this paragraph further comprising splitting the recycle water to a first and a second bioreactor. An embodiment of the invention is one, any or all of prior embodiments in this paragraph up through the first embodiment in this paragraph wherein the concentration of oxygen dissolved in the recycle water is about 12 to 1. An embodiment of the invention is one, any or all of prior embodiments in this paragraph up through the first embodiment in this paragraph wherein a majority of sulfides within said water stream are oxidized to sulfates by said chemolithotrophic sulfur oxidizing bacteria. An embodiment of the invention is one, any or all of prior embodiments in this paragraph up through the first embodiment in this paragraph wherein said packing material contains about 10,000 mg/L of fixed biomass of said bacteria. An embodiment of the invention is one, any or all of prior embodiments in this paragraph up through the first embodiment in this paragraph wherein said water stream comprises a salt concentration of more than 1% total salinity. An embodiment of the invention is one, any or all of prior embodiments in this paragraph up through the first embodiment in this paragraph wherein said mixed water stream flow through said autotrophic obligate chemolithotrophic bacteria. An embodiment of the invention is one, any or all of prior embodiments in this paragraph up through the first embodiment in this paragraph wherein said purified water is reused in an industrial process or discharged into nearby ground water.

Without further elaboration, it is believed that using the preceding description that one skilled in the art can utilize the present invention to its fullest extent and easily ascertain the essential characteristics of this invention, without departing from the spirit and scope thereof to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

The invention claimed is:

1. A process for removing sulfides from a feed water stream in a bioreactor wherein the feed water stream contains from about 1 mg/L to about 2500 mg/L of sulfur compounds on an elemental sulfur basis, the process comprising:
    (a) passing the feed water stream through a fixed film bioreactor containing an effective quantity of autotrophic obligate chemolithotrophic bacteria immobilized on a packing material within said bioreactor;
    (b) recycling a portion of a recycle water from a bioreactor effluent to the bioreactor;
    (c) passing air to the said recycle water to saturate the recycle water with dissolved oxygen to produce oxygenated recycle water;
    (d) mixing the oxygenated recycle water with the feed water stream to provide a mixed water stream that is passed through the bioreactor;
    (e) oxidizing the sulfides in said mixed water stream in the bioreactor to form sulfates; and
    (f) removing a purified water stream comprising less than about 0.5 mg/L sulfides from said bioreactor.

2. The process of claim 1 wherein said feed water stream is selected from the group consisting of briny ground water, fracking wastewater, sulfidic caustic wastewater, sour water from refining or from petrochemical processing, sulfidic sewer water, and sour water generated by anaerobic digesters and mixtures thereof.

3. The process of claim 1 wherein said autotrophic obligate chemolithotrophic bacteria are selected from the group consisting of *Acidithiobacillus ferrooxidans, Thermithiobacillus tepidarius, Sulfurimonas denitrificans, Desulfocapsa sulfoexigens, Thiobacillus, Halothiobacillus, Thiomicrospira, Sulfolobus, Acidianus, Sulfurisphaera*, and *Sulfurococcus*.

4. The process of claim 1 wherein said purified water stream comprises less than about 0.2 mg/L sulfides.

5. The process of claim 1 wherein the ratio of the recycle water to the feed water stream is about 18 to 1.

6. The process of claim 1 further comprising splitting the recycle water to the fixed film bioreactor and another bioreactor.

7. The process of claim 1 wherein the concentration of oxygen dissolved in the recycle water is about 12 mg/L to 1 mg/L.

8. The process of claim 1 wherein a majority of sulfides within said mixed water stream are oxidized to sulfates by said chemolithotrophic sulfur oxidizing bacteria.

9. The process of claim 1 wherein said packing material contains about 10,000 mg/L of fixed biomass of said bacteria per liter of water.

10. The process of claim 1 wherein said water stream comprises a salt concentration of more than 1% total salinity.

11. The process of claim 1 wherein said mixed water stream flow through said autotrophic obligate chemolithotrophic bacteria.

12. The process of claim 1 wherein said purified water is reused in an industrial processor discharged into nearby ground water.

* * * * *